(12) United States Patent
Kalyanaraman

(10) Patent No.: US 7,363,616 B2
(45) Date of Patent: Apr. 22, 2008

(54) SYSTEMS AND METHODS FOR PRIORITIZED DATA-DRIVEN SOFTWARE TESTING

(75) Inventor: Karthik Kalyanaraman, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 616 days.

(21) Appl. No.: 10/941,602

(22) Filed: Sep. 15, 2004

(65) Prior Publication Data

US 2006/0069961 A1 Mar. 30, 2006

(51) Int. Cl.
*G06F 9/44* (2006.01)
*G06F 11/00* (2006.01)

(52) U.S. Cl. .................................. 717/124; 714/38
(58) Field of Classification Search ........ 717/124–135; 714/38
See application file for complete search history.

(56) References Cited

U.S. PATENT DOCUMENTS

| | | | |
|---|---|---|---|
| 6,102,967 A * | 8/2000 | Feigner et al. ............. | 717/113 |
| 6,219,829 B1 * | 4/2001 | Sivakumar et al. ......... | 717/131 |
| 6,223,306 B1 | 4/2001 | Silva et al. .................. | 714/37 |
| 6,385,741 B1 * | 5/2002 | Nakamura ................... | 714/38 |
| 6,401,220 B1 * | 6/2002 | Grey et al. .................. | 714/33 |
| 6,725,399 B1 * | 4/2004 | Bowman ...................... | 714/38 |
| 6,961,873 B2 * | 11/2005 | Dubovsky ................... | 714/38 |
| 6,993,748 B2 * | 1/2006 | Schaefer ..................... | 717/124 |
| 2003/0217308 A1 * | 11/2003 | Volkov ........................ | 714/38 |
| 2003/0233635 A1 * | 12/2003 | Corrie ......................... | 717/124 |
| 2004/0003068 A1 | 1/2004 | Boldman et al. ........... | 709/223 |
| 2004/0143819 A1 * | 7/2004 | Cheng et al. ............... | 717/125 |
| 2004/0194064 A1 * | 9/2004 | Ranjan et al. .............. | 717/124 |
| 2006/0248405 A1 * | 11/2006 | Ponczak et al. ............. | 714/38 |

OTHER PUBLICATIONS

Integrating testability analysis tools with automatic test systems (ATS), Pillari, J.; Pertowski, T.; Protin, A.; Swavely, W.G.; Unkle, C.R., AUTOTESTCON '95. 'Systems Readiness: Test Technology for the 21st Century'. Conference Record, Aug. 8-10, 1995, pp. 503-507, IEEE.*

Software-based self-test methodology for crosstalk faults in processors, Xiaoliang Bai; Li Chen; Dey, S.,High-Level Design Validation and Test Workshop, 2003. Eighth IEEE International, Nov. 12-14, 2003, pp. 11-16, IEEE.*

(Continued)

*Primary Examiner*—Wei Zhen
*Assistant Examiner*—Satish S Rampuria
(74) *Attorney, Agent, or Firm*—Woodcock Washburn LLP

(57) ABSTRACT

Systems and methods for a test harness that are provided that allow for effective control over both the data records and the test methods that are used in a software test run. Data records and/or test methods can be associated with a priority, such that a level of priority may be selected for a particular test run, and substantially only data records and test methods of the selected priority are used in the test. The invention may be implemented as a data driven test pattern class library. The data driven test pattern class library may generate concrete prioritized test cases dynamically using code document object model (code DOM) for substantially each data record by using a class decorated with known custom attributes. The invention can be used to help testers implement data driven tests effectively and in an easily maintainable fashion with minimal code.

15 Claims, 9 Drawing Sheets

OTHER PUBLICATIONS

Automated generation of test programs from closed specifications of classes and test cases, Wee Kheng Leow; Siau Cheng Khoo; Yi Sun, Software Engineering, 2004. ICSE 2004. Proceedings. 26th International Conference on, May 23-28, 2004, pp. 96-105, IEEE.*

TPS development of parallel automatic test systems, Zhu Xiaoping; Xiao Ming-qing; Tang Xiao-jun, AUTOTESTCON 2004. Proceedings, Sep. 20-23, 2004, pp. 248-253, IEEE.*

A test harness for maintaining unfamiliar software, Newman D.J., Software Maintenance, 1988., Proceedings of the, Conference on, Oct. 1988, IEEE, pp. 409-416.*

Model-based testing in practice, Dalal, S.R.; Jain, A.; Karunanithi, N.; Leaton, J.M.; Lott, C.M.; Patton, G.C.; Horowitz, B.M., Software Engineering, 1999. Proceedings of the 1999 International Conference on, 1999, IEEE, pp. 285-294.*

Automating test case generation for the new generation mission software system, Yu-Wen Tung; Aldiwan, W.S., Aerospace Conference Proceedings, 2000, IEEE, vol. 1 2000, pp. 431-437 vol. 1.*

A process for improving software testability, Lamoreaux, T.; Ofori-Kyei, M.; Pinone, M., Software Maintenance, 2004. Proceedings. 20th IEEE International Conference on, Sep. 11-14, 2004, IEEE, p. 1-1.*

Amaranth, P., "A Tcl-Based Multithreaded Test Harness," *Proceedings of 6th USENIX Annual TLC/TK Conference*, San Diego, California, Sep. 18-24, 1998, 69-77.

Edelstein, O. et al., "Framework for Testing Multi-Threaded Java Programs," *Concurrency and Computation Practice & Experience*, 2003, 15(3-5), 485-499.

Grady, S. et al., "QuaSR: A Large-Scale Automated, Distributed Testing Environment," *Proceedings of the Fourth Annual Tcl/Tk Workshop*, Monterey, California, Jul. 10-13, 1996, 61-68.

Hartmann, J., "Testing and Debugging COM Components," *Windows Developer Magazine*, 2002, 13(6), 35-44.

Jagadeesan, L.J. et al., "Specification-Based Testing of Reactive Software: Tools and Experiments-Experience Report," *Proceedings of International Conference on Software Engineering. ICSE*, Boston, Massachusetts, May 17-23, 1997, 525-535.

* cited by examiner

SYSTEMS AND METHODS FOR PRIORITIZED DATA-DRIVEN SOFTWARE TESTING

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2004, Microsoft Corp.

FIELD OF THE INVENTION

This invention relates to software testing, and more particularly to data-driven software testing.

BACKGROUND OF THE INVENTION

Data driven testing is a powerful technique for thorough testing of data dependent software systems. The basic idea in data driven testing is to fix a use case, or an instance of the use of software, such as a likely consumer use of software, and run the use case in the context of several data records. When a large number of use cases are tested against a large number of data records, it is convenient to automate the testing process. The automation software is referred to as a test harness.

FIG. 1a illustrates prior art test harness software 101 for data driven testing. The harness 101 can comprise a plurality of test methods 101a-101c, which contain automation for testing particular use cases of software 105. For example, test method 101a might direct software under test 105 to open two data records and merge the contents of the data records into a new record.

The harness 101 can feed data records 100a-100f to the various test methods 101a-101c such that each method test its aspect of the software under test 105 with a variety of data records. Thus, test method 101a can, for example, instruct software under test 105 to merge 100a with another data record into a new record. Test method can then instruct software under test 105 to merge 100b with another data record into a new record, and so on. Similarly, test method 101b can, for example, instruct software under test 105 to process data record 100a according to a specified function, then process data record 100b according to a specified function, and so on for each data record.

Test harness 101 may also compare the actual output 102 from tested software 105 with desired output 103. The desired output 103 may be logged in a specification for the software under test. For example, a very simple software under test 105 may add three units to any data record that is entered. Thus, if the number five is entered, e.g. as a first tested data record 100a, then software under test 105 should output the number eight. The number eight could be stored, e.g., as 103a. in a specification with the desired output 103 for the software under test. The test harness 101 can provide the function of comparing any actual output 102a with the desired output 103a. The test harness may include a process for making this comparison and generating results 104 to indicate which tests were passed, which were failed, and other useful information about the tests that were conducted.

Note that it is often desirable to control the subset of tests that are performed. It is often unnecessary to test software 105 against each and every test method 101a-101c in combination each and every data record 100a-100f. Such a practice may consume too many testing resources: both computing resources in processing all the tests, and human resources in filtering through and analyzing the relevant test results. FIG. 1a is simplified from a more typical situation that may include thousands of data records and thousands of test method variations. To control the number and types of tests that are performed, the data records 100a-100f may be associated with a priority. For some tests, it may be necessary to test only high-priority records, and it is desirable to automatically filter such high-priority records and run only the associated high-priority tests.

Similarly, the test methods 101a-101c may be associated with a priority. For some test runs, it may be considered necessary to test only certain high-priority test methods or test method variations. It is desirable to automatically filter such high-priority test methods and run only the associated high-priority tests.

There are several prior art patterns that a test harness can presently adopt to implement data driven tests. These various patterns each have shortcomings in controlling the particular data records that are used in a test, and in controlling which test method variations are used in a test. Thus, the following prior art test harness patterns do not allow for the level of test control that can be desired in choosing test methods and data records to run in a test.

FIG. 1b presents a set of components that can replace the section enclosed by a dotted line 150 in FIG. 1a. FIG. 1b represents one common prior art test harness configuration: the loop pattern. When a test harness 101 is configured as a loop, data 100 is fed serially to a test method 101a by a loop process 124. The below pseudo-code provides an common exemplary implementation of a loop process 124 for a test harness conducting data driven tests:

```
for each (DataRecord record in DataRecords)
{
    // Execute Test code for the Data Record
}
```

The pseudo test code sample set forth above is satisfactory when the goal is simply to exercise a particular piece of developer code through all possible sets of test data. Since most software systems have different facets that are tested in the context of every data record, the loop pattern is a sensible solution in many settings.

Though a reasonable first solution to testing a use case against a large amount of data, the loop pattern approach has some serious shortcomings that may arise. These shortcomings, in general, relate to the lack of control over which tests may be desirable to run. More specifically, test granularity and test prioritization are difficult to achieve.

Granularity of implemented tests: The loop pattern is not granular, quantifiable and isolatable. It is therefore useless in generating test reports that are used by management to determine if the code under test is fit for a release. It is also useless for selectively running some tests to determine particular areas for software improvement, such as build quality. The loop pattern approach may thus not satisfactorily meet the needs of professional testing organizations due to its lack of granularity.

Prioritization of tests: The loop pattern does not support any meaningful test prioritization. To generally describe prioritization, the unit of testing in most test organizations is the "test method." In most test organizations, priorities are associated with test methods to determine the gravity of a particular failure. If a failure of a test method is a "critical failure," for example, the release of the tested software may be prevented or delayed. Test method priorities could also be used to determine a subset of tests that should pass for build verifications, or subsets that should pass to meet some other requirement.

To accommodate the use of test methods, most test harnesses have the notion of a "test class" which contains test methods. Test classes may fit the standard notion of a class in computer science, such as a Common Language Runtime (CLR) class. Test classes may be given a special attribute which indicates to the test harness that they are test classes. Test methods may be regular member methods of a test class, or test classes, with a special attribute to indicate to a test harness that the test method is a unit of a particular test class. The attribute associated with a test method may also contain a priority for the method.

Further, a test assembly is generally understood as a collection of test classes, along with a special class, often called "test suite" which extends a test harness defined class for the purpose of ease of identification in an assembly. This test suite class can act as container for an instantiated subset of test classes in a test assembly. The test suite may thus inspect its assembly to instantiate all classes marked as a particular test class. The test harness can look for all test suite classes in an assembly, and query each of them to get the test classes contained in the test suite. The test harness can invoke all the test methods of the obtained test classes. Also the harness could collect the results of the test method invocations and generate a report of the test automation.

FIG. 1c illustrates an expanded view of prior art FIG. 1b, and demonstrates that control process 130 cannot access or respond to testing priorities, whether they are data priorities 131 or test method priorities 132, when the harness 101 is configured as a loop.

FIG. 1d presents a set of components that can replace the section enclosed by a dotted line 150 in FIG. 1a. FIG. 1d represents another common prior art practice: the class extension pattern. When a test harness 101 is configured in a class extension pattern, a generic class 125 can take in data records 100a-100f, and implement an appropriate test method 101d-101f.

The below provided pseudo-code is a common implementation of a class extension pattern generic class 125 for test harnesses that implement data-driven tests. Note that in this pattern, a tester implements a generic class without a special attribute to mark it is a test class. The generic class can takes in a data record in its constructor, and implements test methods, with special attributes that mark them to be a test method, in that class. For every unique data record, the tester can author a test class that simply extends the special class.

```
// Generic Test Class
public class GenericImplementation{
    public GenericImplementation(DataRecord record){...};
    [TestMethod(Id=1,Pri=0)]
    public ReturnCode Test1( ){...}
    [TestMethod(Id=2,Pri=1)]
    public ReturnCode Test2( ){...}
}
[TestClass]
public class DataRecordTest1:GenericImplementation{
    public DataRecordTest1:GenericImplementation(record1){..}
```

-continued

```
}
[TestClass]
public class DataRecordTest2:GenericImplementation{
    public DataRecordTest2:GenericImplementation(record2){..}
}
....
```

This test pattern is, in general, better than the loop based pattern. The tests are now granular and quantifiable. Though effective, this pattern has a serious drawback in that any given test method in all the test classes have the same priority. This is because the test methods are pulled into the class via inheritance, and the data record used to test has no input to the priority of a test method.

FIG. 1e illustrates an expanded view of prior art FIG. 1d, and demonstrates that, while control process 133 can control testing based on data priorities 131, the generic implementation of test methods operates to strip test method priorities 132 thereby blocking the use of test method priorities 132 as a means of controlling which tests to run. A test harness that uses the class extension pattern therefore does not allow for effective control over both the data records and the test methods that will be used in a given test run.

Finally, data driven tests may be implemented, using presently available techniques, using the cut and paste pattern. This pattern is not illustrated. Using the cut an paste pattern, a tester implements a test class for a particular data record, and then creates test classes for every data record used in a test. The tester simply cuts and pastes the code from an implemented test class, and modifies the data record and method priorities manually in all the test classes. This pattern enables the tests to be granular and prioritized but it is inelegant, and cumbersome to implement and maintain. A small change in the semantics of one of the test methods will require changes in the corresponding test method in all implemented test classes. When 5000 data records are commonly involved in a test, the work needed to manually alter the test methods using the cut and paste pattern is unacceptable.

There is a need in the art to overcome the aforementioned limitations of current systems and methods for data driven software testing. There is a need to implement more granular, prioritized data driven tests. Moreover, there is a need to do so in such a way as to help testers implement data driven tests effectively and in an easily maintainable fashion with minimal code.

SUMMARY OF THE INVENTION

In consideration of the above-identified shortcomings of the art, various embodiments of the present invention provide systems and methods for a test harness that allows for effective control over both the data records and the test methods that are used in a software test run. Data records and/or test methods can be associated with a priority, such that a level of priority may be selected for a particular test run, and substantially only data records and test methods of the selected priority are used in the test. Embodiments of the invention may be implemented as a data driven test pattern class library which can be easily plugged into most test harnesses for managed code. The data driven test pattern class library may generate concrete prioritized test cases dynamically using code document object model (code DOM) for substantially each data record by using a class decorated with known custom attributes. Embodiments can be used to help testers implement data driven tests effectively and in an easily maintainable fashion with minimal code. Specific exemplary embodiments of the invention are described below.

BRIEF DESCRIPTION OF THE DRAWINGS

The systems and methods for prioritized data-driven software testing in accordance with the present invention are further described with reference to the accompanying drawings in which.

DETAILED DESCRIPTION OF ILLUSTRATIVE EMBODIMENTS

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Figure 2A:
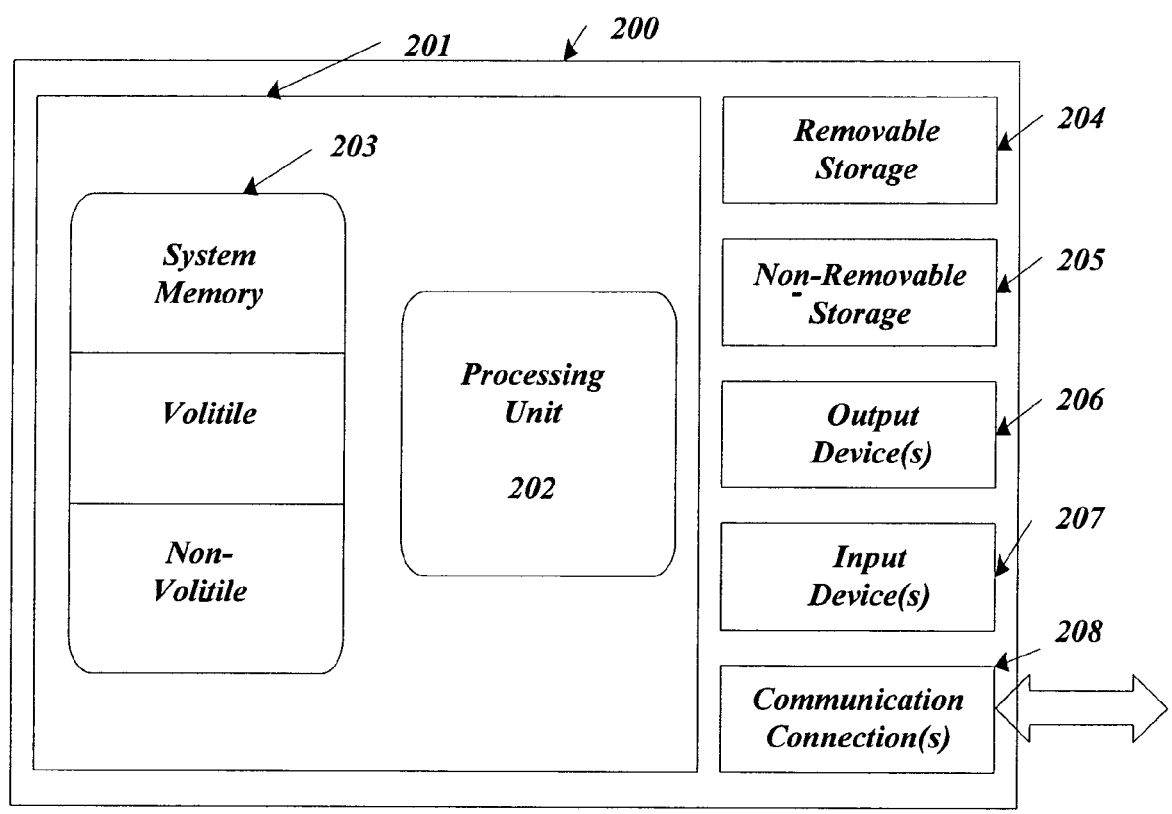
FIG. 2a is a block diagram broadly representing the basic features of an exemplary prior art computing device suitable for use in conjunction with various aspects of the invention.
Figure 2B:
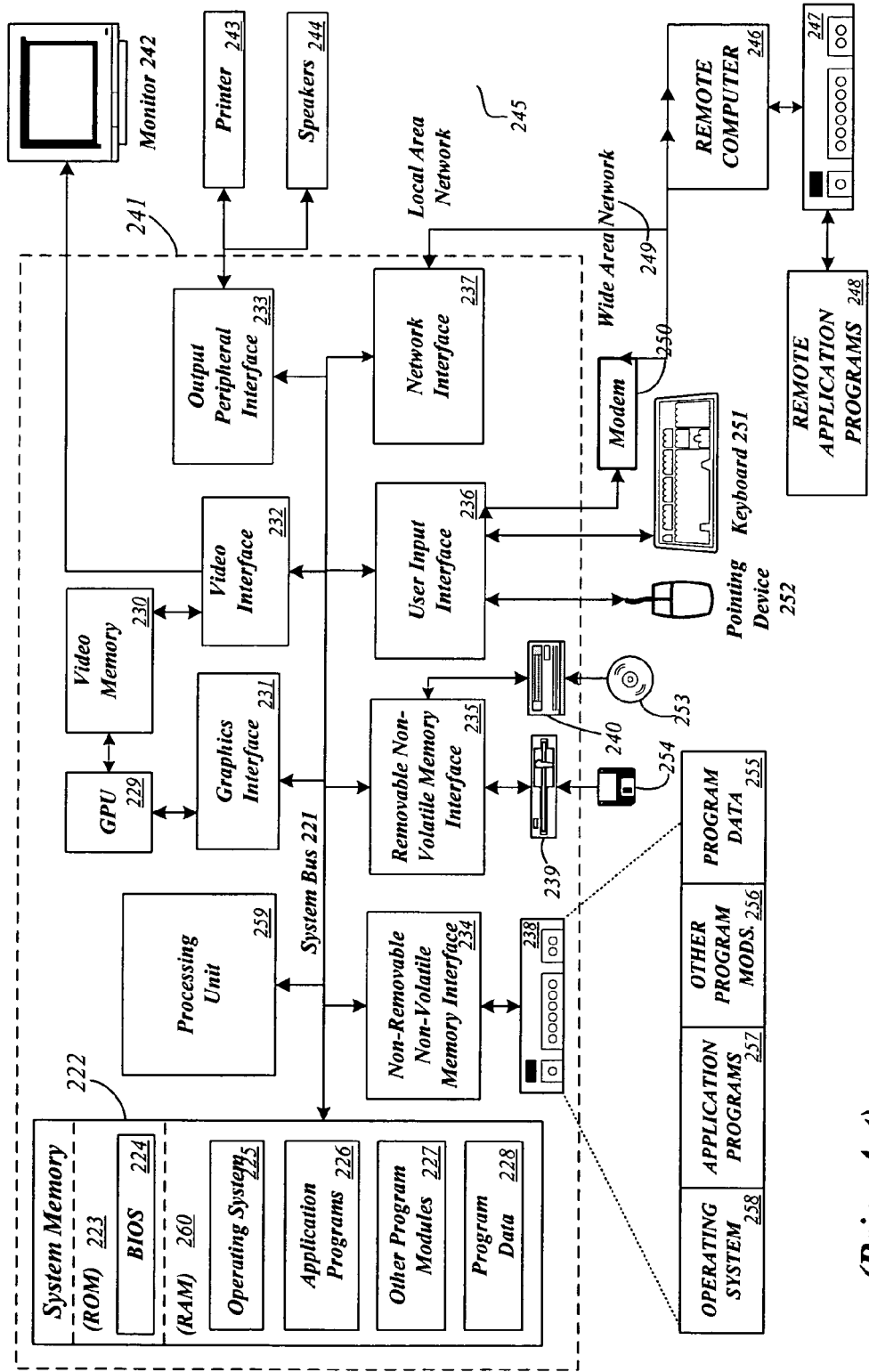
FIG. 2b is a block diagram representing a more detailed exemplary prior art computing device suitable for use in conjunction with various aspects of the invention.
Figure 2C:
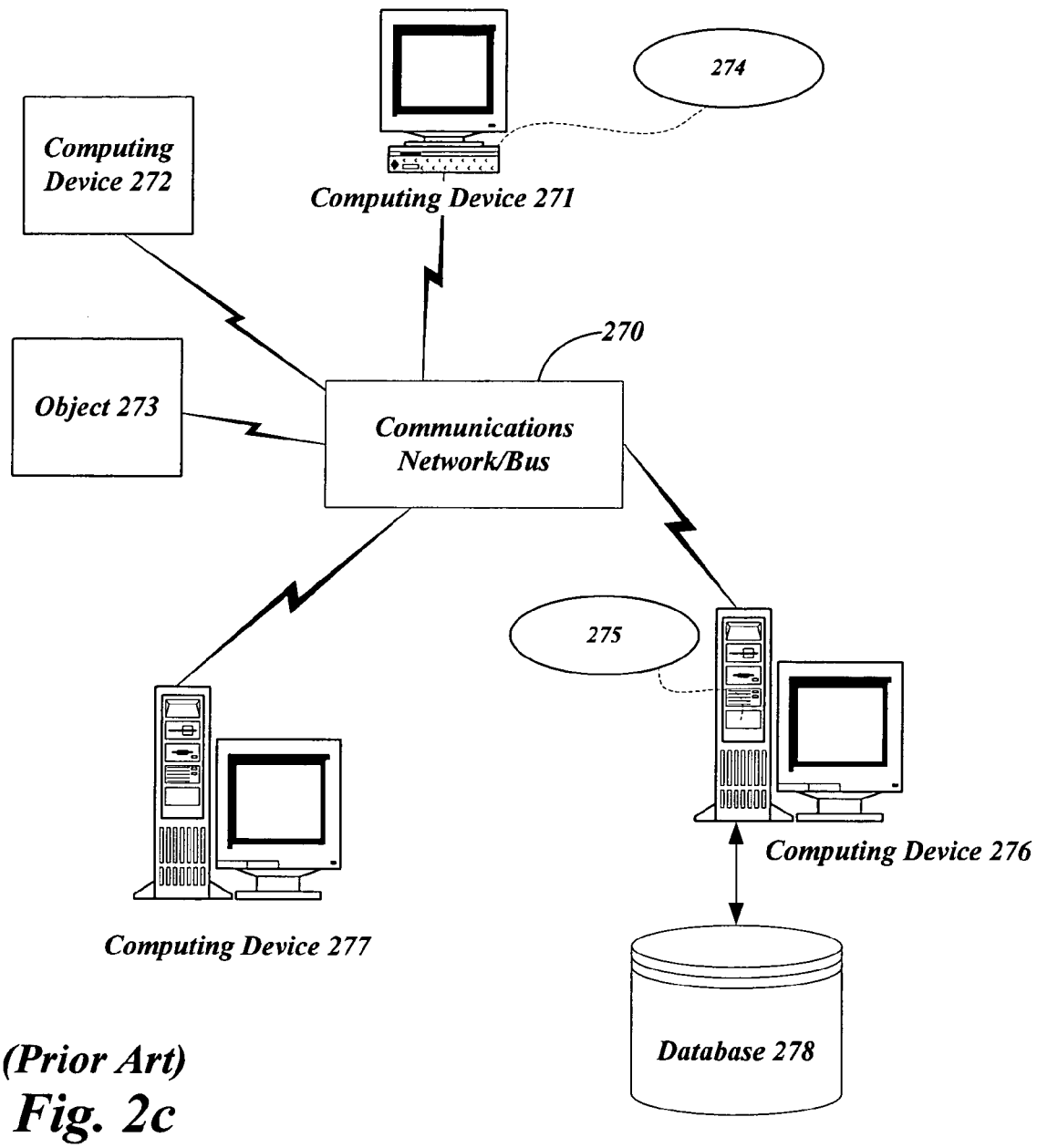
FIG. 2c illustrates an exemplary prior art networked computing environment in which may computerized processes, including those of the invention, may be implemented.

The following detailed description will generally follow the summary of the invention, as set forth above, further explaining and expanding the definitions of the various aspects and embodiments of the invention as necessary. Note first that FIG. 2a-FIG. 2c provide an exemplary computing and network environment that is considered a suitable environment in which to practice various aspects of the invention. Because these figures represent features that are generally understood and commonplace in the industry, the corresponding description is placed at the end of this specification, in a section entitled "exemplary computing and network environment." Following this section is an appendix that provides a sample usage of a test pattern class library for data driven testing, and corresponding exemplary results produced.

Prior to a detailed explanation of the invention as illustrated in the various figures, a brief note on the likely advantages and likely users of the invention is warranted. Through the use of the systems and methods provided herein, data driven testing can be carried out more efficiently, thereby improving the quality of software products. Tests driven by potentially large volumes of data can be implemented in a fashion that is both logically simple and time efficient. Software companies may choose to implement the systems and methods provided herein to improve their local test frameworks and gain a competitive edge in terms of quality. Alternatively, many commercially available test harnesses in the market could make this invention an available default feature and thereby increase the value and desirability of the test harnesses they produce. A further advantage of the embodiments discussed herein is the ease of plugging the data driven test pattern class library into most test harnesses designed for use with managed code.

Figure 1A:
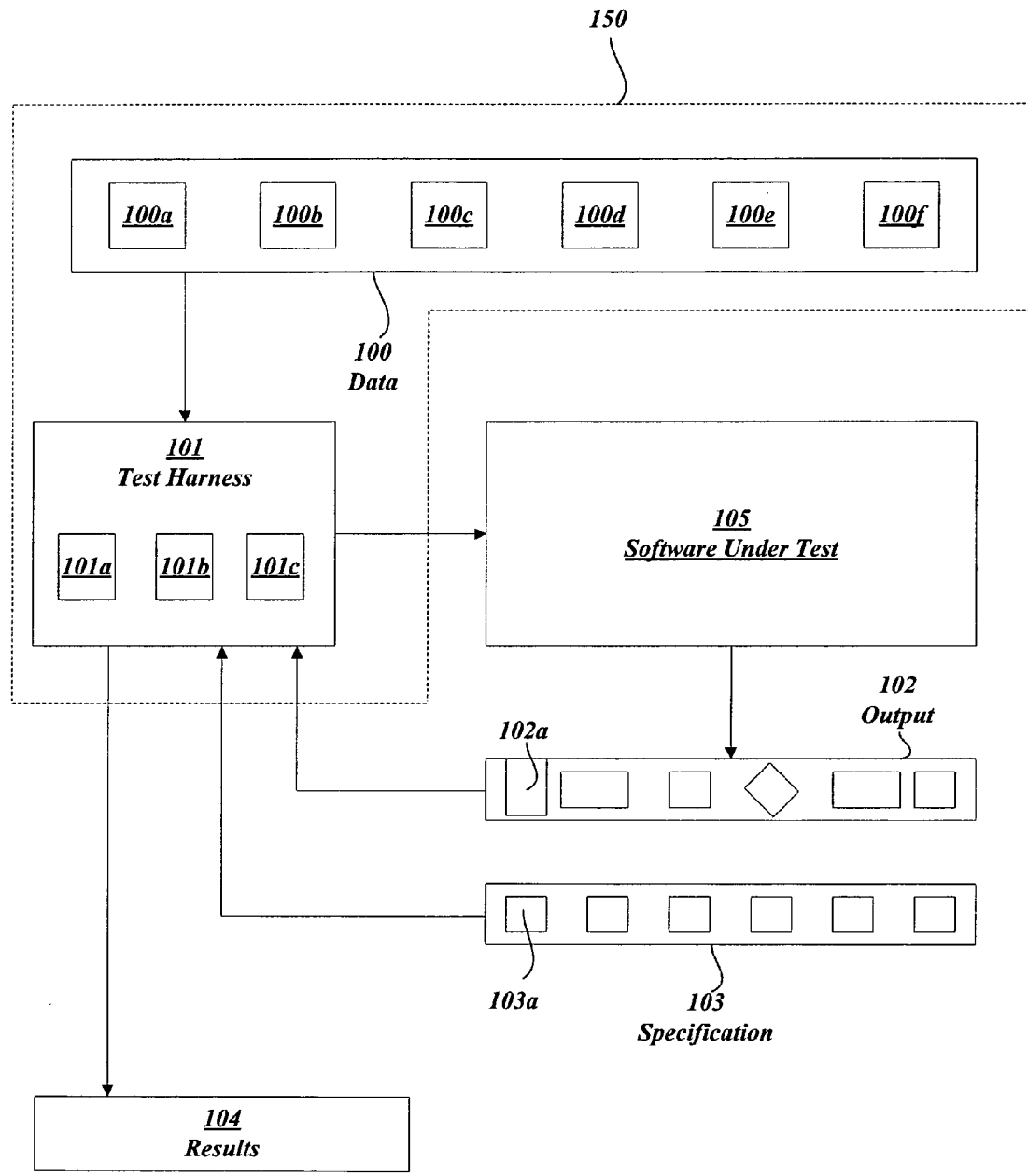
FIG. 1a illustrates prior art test harness software 101 for data driven testing. The harness 101 feeds data 100 to the software under test 105. Test details are dictated by test methods 101a-101c. The harness 101 compares the actual output 102 from tested software 105 with desired output 103. The test harness 101 may return a set of test results 104 from the testing operation.
Figure 1B:
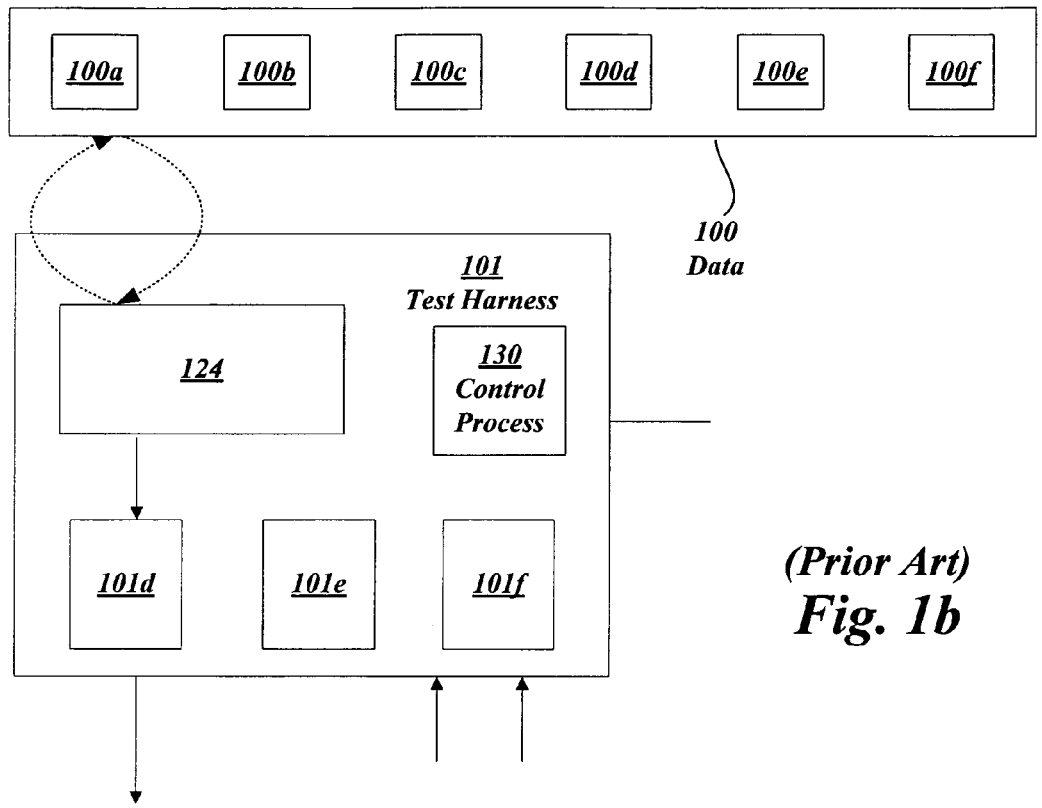
FIG. 1b illustrates an expanded view of FIG. 1a that represents one common prior art practice: the loop pattern. When a test harness 101 is configured as a loop, data 100 is fed serially to a test method 101a by a loop process 124. A control process 130 cannot easily be configured to prioritize which data 100a-100f or which test methods 101a-101c to prioritize.
Figure 1C:
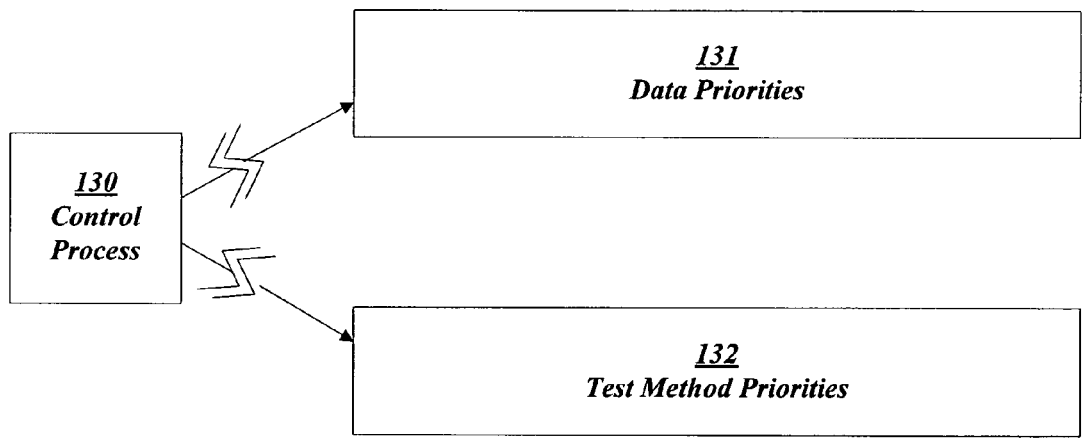
FIG. 1c illustrates an expanded view of prior art FIG. 1b, and demonstrates that control process 130 cannot access or respond to testing priorities, whether they are data priorities 131 or test method priorities 132, when the harness 101 is configured as a loop.
Figure 1D:
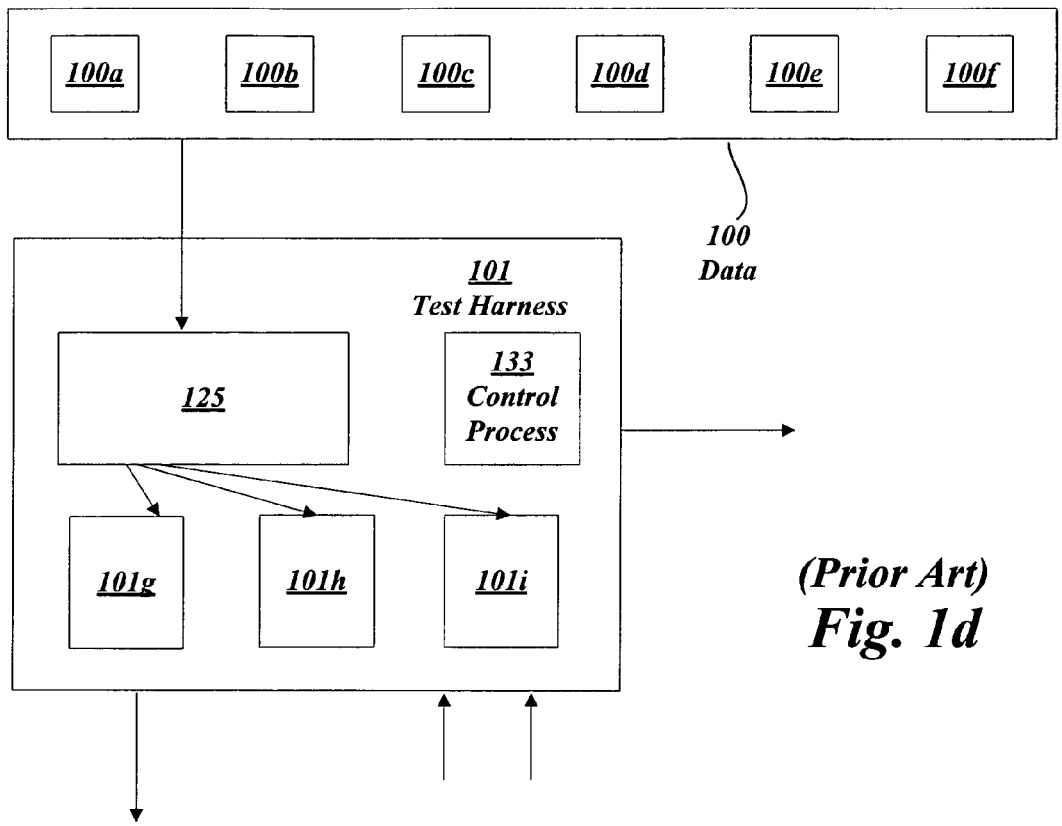
FIG. 1d illustrates an alternative expanded view of FIG. 1a that represents another common prior art practice: the class extension pattern. When a test harness 101 is configured in a class extension pattern, a generic class 125 can take in data records 100a-100f, and implement an appropriate test method 101d-101f.
Figure 1E:
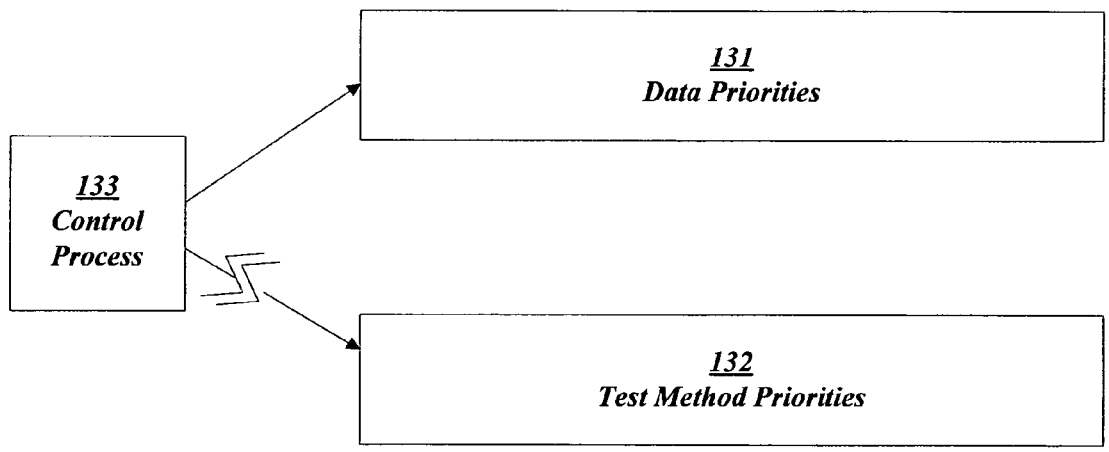
FIG. 1e illustrates an expanded view of prior art FIG. 1d, and demonstrates that, while control process 133 can control testing based on data priorities 131, the generic implementation of test methods operates to strip test method priorities 132 thereby blocking the use of test method priorities 132 as a means of controlling which tests to run.
Figure 3:
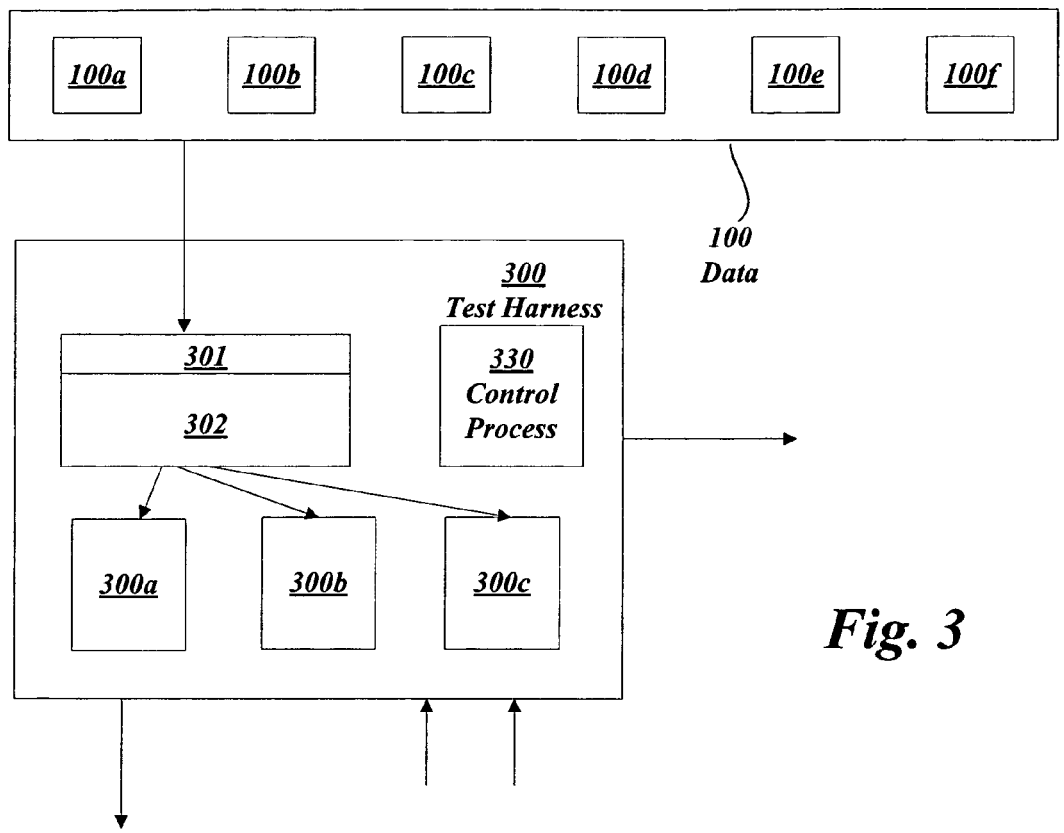
FIG. 3 illustrates a test harness 300 with a data driven test pattern class library 302 that can generate concrete prioritized test cases dynamically using code document object model (code DOM) for each data record 100a-100f. This can be accomplished by using a class 302 decorated with known custom attributes 301.

FIG. 3 illustrates various embodiments of the invention. FIG. 3, like FIGS. 1b and 1d, presents a set of components that can replace the section enclosed by a dotted line 150 in FIG. 1a. The various aspects of the invention presented in FIG. 3 are first described very concisely here, and then a more involved explanation is provided below. Concisely stated, various embodiments of the invention can provide a test harness 300 with a data driven test pattern class library 302 that can generate concrete prioritized test cases 300a-300c dynamically using code document object model (code DOM) for each data record 100a-100f. This can be accomplished by using classes in the library 302 that are decorated with known custom attributes 301.

To further explain the concise statements above, the various terms used are further elaborated below. The concise description can be broken into several sections. First, the concise description provides a test harness 300 with a data driven test pattern class library 302. Next, the concise description provides that the library 302 can generate concrete prioritized test cases 300a-300c dynamically using code DOM provides that classes in the library 302 may be decorated with known custom attributes 301. Each of these three sections contains several meaningful elements that are further elaborated below.

Turning to the first section of the concise description, a class library 302 is analogous to a subroutine library in earlier, procedural programming. In object-oriented programming, a class library is a collection of prewritten classes or coded templates, any of which can be specified and used by a programmer when developing an application program. The programmer specifies which classes are being used and furnishes data that instantiate each class as an object that can be called when the program is executed.

A test pattern class library refers to the type of class library that is used in various embodiments of the invention. A test pattern class library is one in which at least some of the classes in the library can be considered "test patterns." Instances of these classes may be test methods, or test method variations. The test methods may correspond to use cases for the software under test. Thus, the classes in the library can be described as "test pattern classes" because they provide a set, or pattern, of one or more actions to perform in a test.

The test patterns of the concise description are referred to as "data driven." As described in the background, data driven testing is a powerful technique for thorough testing of data dependent software systems. The basic idea in data driven testing is to fix a use case, or an instance of the use of software, such as a likely consumer use of software, and run the use case in the context of a plurality of data records.

When a large number of use cases are tested against a large number of data records, it is convenient to automate the testing process. The automation software is referred to as a test harness. The test harness refers to test software with a range of functions for carrying out tests on software and then arranging the results. While the data driven test pattern class library provided here need not be associated with the other functions of a test harness, a preferred implementation of the invention comprises the combination of the data driven test pattern class library and other, prior art functions of test harnesses to provide a useful and complete testing tool.

Turning to the second section of the concise description provided above, the library can generate concrete prioritized test cases 300a-300c dynamically using code DOM for each data record 100a-100f. A test case, e.g. 300a is an instance of a particular test to be carried out on software 105. In this sense, a test case may differ from a test method somewhat, in that a test method is traditionally combined with any data to perform a test on software 105. A test case 300a may be precombined with a particular data record 100a or records 100a-100f to carry out the function of performing a specific test with a specific data record. The test case is said to be "concrete" because it is instantiated and is no longer abstract, as are the classes in the class library. Classes, once again, can be thought of as abstract templates that become concrete test cases when they are instantiated and associated with the data records 100a-100f that they will use in a test.

Figure 4:
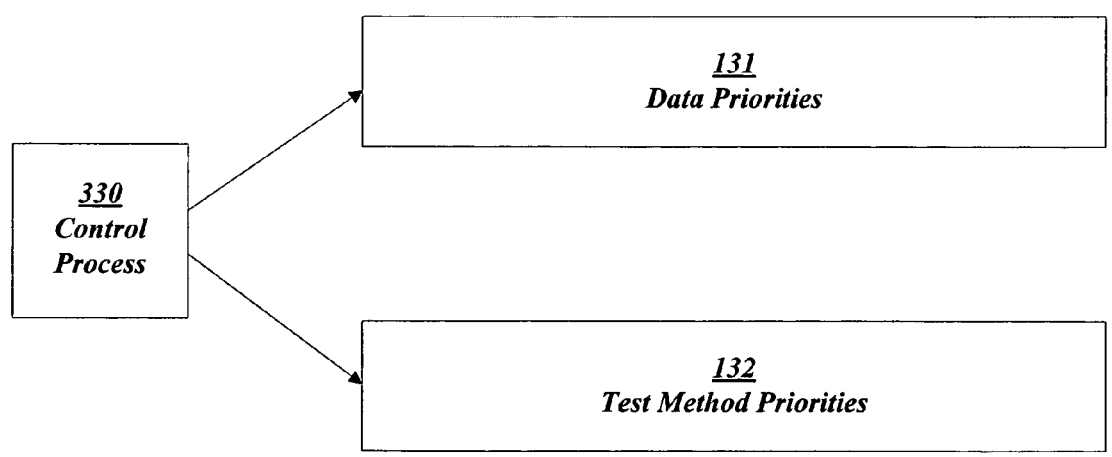
FIG. 4 illustrates an expanded view of FIG. 3 in which a test harness control process 330 can access and respond to both data priorities 131 and test method priorities 132.

FIG. 4 demonstrates conceptually the notion that the concrete test cases generated using the test pattern class library can be prioritized. Once again, 131 represents data priority information, and 132 represents test method, or test case priority information. Using the systems and methods provided here, a control process 330 can have easy access to both types of priority information. The data prioritization information is obtainable from the data 100 itself, while the test case priority information is obtainable from the attributes 301 on classes in the class library 302. Further discussion of the attributes 301 is provided below.

The test cases 300a-300c can be generated dynamically. Dynamic generation refers to the ability to create the test cases "on the fly" as a test is being carried out. The test cases need not be set up prior to a test run. This is an advantage of using a class library-the classes are available for instantiation as needed. For further detail on the dynamic generation of test cases, refer to FIG. 5 and corresponding text.

The test cases 300a-300c can be generated using code Document Object Model (DOM) for each data record 100a-100f. DOM generally refers to a programming API for documents. It defines the logical structure of documents and the way a document is accessed and manipulated. In the World Wide Web Consortium DOM specification, the term "document" is used in the broad sense—increasingly, Extensible Markup Language (XML) is being used as a way of representing many different kinds of information that may be stored in diverse systems, and much of this would traditionally be seen as data rather than as documents. Nevertheless, XML presents this data as documents, and the DOM may be used to manage this data.

With the Document Object Model, programmers can create and build documents, navigate their structure, and add, modify, or delete elements and content. Anything found in a document can be accessed, changed, deleted, or added using the Document Object Model.

In the Document Object Model, documents may have a logical structure which is very much like a tree; to be more precise, it is like a "forest" or "grove" which can contain more than one tree. However, the Document Object Model does not specify that documents be implemented as a tree or a grove, nor does it specify how the relationships among objects be implemented in any way. In other words, the object model specifies the logical model for the programming interface, and this logical model may be implemented in any way that a particular implementation finds convenient. One important property of DOM structure models is structural isomorphism: if any two Document Object Model implementations are used to create a representation of the same document, they will typically create the same structure model, with precisely the same objects and relationships.

The Document Object Model is an object model in the traditional object oriented design sense: documents are modeled using objects, and the model encompasses not only the structure of a document, but also the behavior of a document and the objects of which it is composed. In other words, the nodes in the above diagram do not represent a data structure, they represent objects, which have functions and identity. As an object model, the Document Object Model can identify:

the interfaces and objects used to represent and manipulate a document the semantics of these interfaces and objects—including both behavior and attributes the relationships and collaborations among these interfaces and objects The structure of Standard Generalized Markup Language (SGML) documents has traditionally been represented by an abstract data model, not by an object model. In an abstract data model, the model is centered around the data. In object oriented programming languages, the data itself is encapsulated in objects which hide the data, protecting it from direct external manipulation. The functions associated with these objects determine how the objects may be manipulated, and they are part of the object model. Thus, while preferred implementations of the invention generate test cases 300a-300c using code DOM for each data record 100a-100f, other implementations may make use of an abstract data model instead.

Turning finally to the third and final section of the concise description provided above, classes in the library 302 may be decorated with known custom attributes 301. The use of custom attributes in a class library is known in the art. However, the use of attributes to designate a priority for, or one or more data records for a class in a test pattern class library is an advance in the art that provides great improvements over prior test harness systems. In general, when an attribute from 301 is defined on a class in 302, the class becomes a test class suitable for use with a specific test or range of tests. When a class is a data agnostic test implementation class, as is standard practice in test classes, the class can be instantiated for use with a wide range of data records.

Exemplary Implementation

In an exemplary non limiting implementation, provided below, several harness specific classes are provided, and then several library classes are provided. Naturally, embodiments of the invention can be extended to vary, add, or remove classes from those provided in the simplified example below.

For the purpose of illustration, following harness specific classes may be assumed. Note that the pattern provided here is adaptable with slight modifications for any test harness:

1) Test: An attribute which if defined on a class will make the class a Test Class.
2) Test Method: An attribute which if defined on method of a Test Class will make that method a Test Unit.
3) Suite: A class which when extended by a another class will make the class a Test Suite and will be loaded by the harness and queried, using a Get Test Cases method, to get the Test Classes in the assembly to which it belongs.

The following library classes may be provided:

1) Data Driven Test Suite: This class inherits the Suite class from the harness. It overrides the method Get Test Cases in Suite class and dynamically generates in memory a class for every Data Record Attribute defined on the classes in the assembly.
2) Data Record: This class inherits from Common Language Runtime (CLR) Attribute class and, when defined on a class, marks the class as Data Driven Test Class.

The classes provided above may be utilized to create the following exemplary prototype:

```
[AttributeUsage(AttributeTargets.Class, AllowMultiple = true)]
public class DataRecord: Attribute{
    // Data . Actual Test Data Record
    public object Data{
            get{ ..}
            set {..}
    }
    // Id for the Data for uniquenesss
    public int Id{
            get{ ..}
            set {..}
    }
    // Priority or wieght of the data
    public int Pri{
            get{ ..}
            set {..}
    }
    // Description of the Data
    public string Desc{
            get{ ..}
            set {..}
    }
}
public abstract class DataDrivenTestSuite:Suite{
    // can be overriden to implement custom priority calculation heuristics
    public virtual int ComputePriority(int DataPriority,int MethodPriority){
           return DataPriority+MethodPriority;
    }
    // method the Test Harness Queries to get Test Classes
    public override obiect[] GetTestCases( ){
        foreach (Module module in Assembly.GetAssembly(this.GetType( )).GetModules( )){
            foreach (Type type in Module.GetTypes( )){
                foreach (DataRecord Attr in Type.GetCustomeAttributes(true)){
                    // Generate a concrete Type for every DataDrivenTestFixture attribute
                    // using code dom and instantiate it by passing instance of implemented
                    // Data Agnostic Test
                    Type GeneratedType = GenerateTypeInMemory(type,attr);
                    object objimpl = Activator.CreateInstance(type,new object[ ]{Attr.Data});
                    object obj = Activator.CreateInstance(GeneratedType,new object[ ]{objimpl});
                    // add obj to array of test cases returned
                }
            }
        }
    }
}
```

Refer to the appendix at the end of this specification for a sample usage of the above exemplary implementation.

Figure 5:
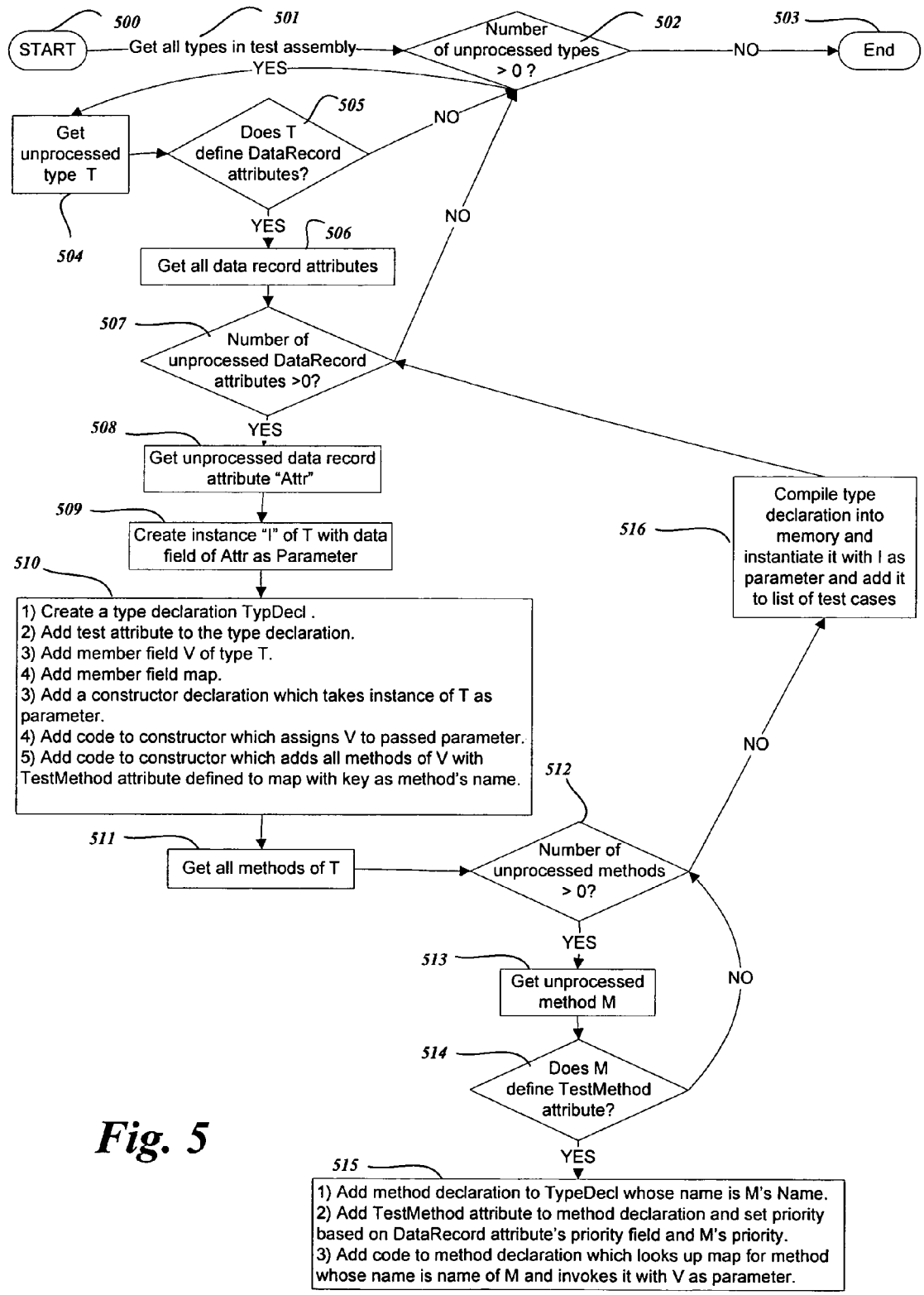
FIG. 5 illustrates a flow chart for dynamic test case generation of a data driven test suite class.

FIG. 5 illustrates a flow chart for dynamic test case generation of a data driven test suite class. Upon the start 500 of the exemplary process, all types in the test assembly can be retrieved 501. So long as there are unprocessed types 502, a next unprocessed type can be retrieved 504. where there are no further unprocessed types, the process can end 503. After taking up an unprocessed type T 504, the type can first be analyzed to determine if it defines any data record attributes 505. If not, the process can return and take up any further unprocessed types 502. If any data record attributes are defined, however, all data record attributes for the type may be retrieved 506. The process may then cycle through all the data record attributes 507 returning to process any further unprocessed types when it is done 502. Each unprocessed data record attribute, "Attr," can be retrieved 508. An instance, referred to here as "I" of the type can be created with the data field of the attribute as a parameter 509. Once the instance "I" is created, step 510 may be performed, comprising:

1) Creating a type declaration, e.g. "Typ Decl."
2) Adding Test Attribute to the type declaration.
3) Adding a member field, e.g., "V" of type T.
4) Adding a member field map, e.g. a map of type "Hashtable."
5) Adding a constructor declaration which takes I as a parameter.
6) Adding code to the constructor, which can assign V to the passed parameter.
7) Adding code to the constructor, which can add all methods of V with a defined Test Method attribute to the map, and optionally using a key as the method's Name.

The process can next retrieve all methods of T 511. For each unprocessed method 512, the unprocessed method can be retrieved 513. When there are no remaining unprocessed methods, the type declaration can be compiled into memory, and can be instantiated it with I as its parameter, and can be added it to a list of test cases 516, and the process can return to a next data record attribute, if any 507. The procedure for processing an unprocessed method M comprises first determining if M defines a test method attribute. If not, the process can move on to a next unprocessed method, if any 512. If so, step 515 may be performed, comprising:

1) Adding a method declaration whose to Type Dec1 whose name is M's Name.
2) Adding the Test Method attribute to the method declaration and setting a priority based on Data Record attribute's priority field and M's priority.
3) Adding code to method declaration which looks in the map for a method whose name is name of M, and then invokes it with V as a parameter.

Figure 6:
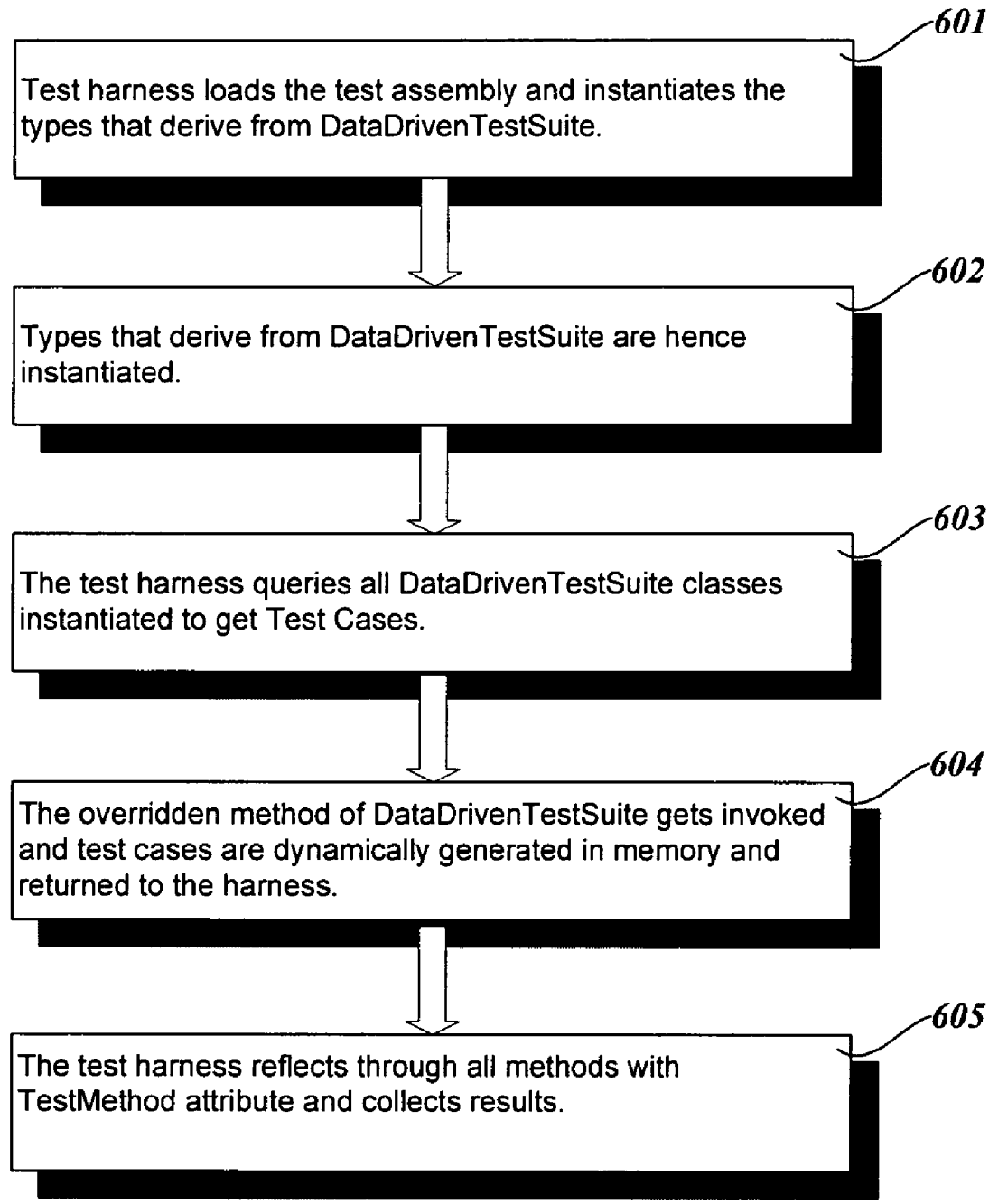
FIG. 6 illustrates a test harness runtime overview flowchart.

FIG. 6 illustrates an exemplary test harness runtime overview flowchart. First, a test harness can load the test assembly and instantiate the types that derive from Suite 601. Next, and by virtue of the occurrence of step 601, the types that derive from Data Driven Test Suite may instantiated 602. Third, the test harness can query substantially all Suite classes instantiated to get Test Case 603. Turning to the fourth step 604, the overridden method of Data Driven Test Suite may be invoked, and test cases can be dynamically generated in memory and returned to the harness. Finally, the test harness may reflect through all, or substantially all methods with Test Method attribute and collects the results.

Exemplary Computing and Network Environment

With reference to FIG. 2a, an exemplary computing device 200 suitable for use in connection with the systems and methods of the invention is broadly described. In its most basic configuration, device 200 typically includes a processing unit 202 and memory 203. Depending on the exact configuration and type of computing device, memory 203 may be volatile (such as RAM), non-volatile (such as ROM, flash memory, etc.) or some combination of the two. Additionally, device 200 may also have mass storage (removable 204 and/or non-removable 205) such as magnetic or optical disks or tape. Similarly, device 200 may also have input devices 207 such as a keyboard and mouse, and/or output devices 206 such as a display that presents a GUI as a graphical aid accessing the functions of the computing device 200. Other aspects of device 200 may include communication connections 208 to other devices, computers, networks, servers, etc. using either wired or wireless media. All these devices are well known in the art and need not be discussed at length here.

FIG. 2b illustrates a somewhat more detailed example of a suitable computing device from FIG. 2a and peripheral systems. The computing system environment 220 is only one example of a suitable computing environment and is not intended to suggest any limitation as to the scope of use or functionality of the invention. Neither should the computing environment 220 be interpreted as having any dependency or requirement relating to any one or combination of components illustrated in the exemplary operating environment 220.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be implemented in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2b, an exemplary system for implementing the invention includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 2b, provide storage of computer readable instructions, data structures, program modules and other data for the computer 241. In FIG. 2b, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 2b. The logical connections depicted in FIG. 2b include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 2b illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments refer to utilizing the present invention in the context of one or more stand-alone computer systems, the invention is not so limited, but rather may be implemented in connection with any computing environment, such as a network or distributed computing environment. Still further, the present invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

An exemplary networked computing environment is provided in FIG. 2c. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2c provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2c, and may itself represent multiple interconnected networks. In accordance with an aspect of the invention, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2c, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, Hyper Text Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework of provided in FIG. 2a and FIG. 2b, and the further diversification that can occur in computing in a network environment such as that of FIG. 2c, the systems and methods provided herein cannot be construed as limited in any way to a particular computing architecture. Instead, the present invention should not be limited to any single embodiment, but rather should be construed in breadth and scope in accordance with the appended claims.

APPENDIX

Sample usage of test pattern class library for data driven testing, and results produced.

```
/*****************************************************
*Sample Test Suite
*Just extend the DataDrivenTestSuite
*****************************************************/
public class MySuite:DataDrivenTestSuite{
   public override int ComputePriority(int DataPriority,int MethodPriority){
      // implement your hueristics
   }
}
/*****************************************************
*sample test case.
*To add a new Data Record the tester
*just needs to add one more
* DataRecord Attribute
*****************************************************/
// Data Record attribute.
// Very High priority data
[DataRecord(Id=1,Pri=0,Desc="Data Record 1",Data="Foo1.xml")]
// High priority data
[DataRecord(Id=2,Pri=1,Desc="Data Record 2",Data="Foo2.xml")]
// Low priority data
[DataRecord(Id=3,Pri=2,Desc="Data Record 3",Data="Foo3.xml")]
public class DataAgnosticTestImplementation{
     public class DataAgnosticTestImplementation( object Data){...};
   // most important scenrio among all for given data
     [TestMethod(Id=1,Pri=0)]
     public ReturnCode TestMethod1( ){...};
     // less important compared to TestMethod1 for given data
     [TestMethod(Id=2,Pri=1)]
     public ReturnCode TestMethod2( ){...};
     // less important compared to TestMethod2 for given data
   [TestMethod(Id=3,Pri=2)]
     public ReturnCode TestMethod3( ){...};
   // less important compared to TestMethod3 for given data
   [TestMethod(Id=4,Pri=3)]
     public ReturnCode TestMethod4( ){...};
}
/*****************************************
*Classes generated in memory
*Class Name is Implementing
*Class Name + DataRecord. Id value
*****************************************/
[Test]
public class DataAgnosticTestImplementation1{
     private DataAgnosticTestImplementation m_implementer;
     private Hashtable m_methods;
     public DataAgnosticTestImplementation1( DataAgnosticTestImplementation implementer){
        m_implementer = implementer;
        foreach (MethodInfo mi in m_implementer.GetMethods( )){
           foreach (TestMethod Attr in mi.GetCustomAttributes(typeof(TestMethod),true)){
           m_methods.Add(mi);
              break;
           }
        }
     }
   // Pri = MySuiteObj.ComputePriority(DataPri,MethodPri)
     [TestMethod(Id=1,Pri=0)]
     public ReturnCode TestMethod1( ){
        return (ReturnCode) ((MethodInfo)m_methods["TestMethod1"].Invoke(m_implementer,new object[ ]{ }));
     };
     // Pri = MySuiteObj.ComputePriority(DataPri,MethodPri)
     [TestMethod(Id=2,Pri=1)]
     public ReturnCode TestMethod2( ){
        return (ReturnCode) ((MethodInfo)m_methods["TestMethod2"].Invoke(m_implementer,new object[ ]{ }));
     };
     // Pri = MySuiteObj.ComputePriority(DataPri,MethodPri)
     [TestMethod(Id=3,Pri=2)]
     public ReturnCode TestMethod3( ){
        return (ReturnCode) ((MethodInfo)m_methods["TestMethod3"].Invoke(m_implementer,new object[ ]{ }));
     };
```

-continued

```
        // Pri = MySuiteObj.ComputePriority(DataPri,MethodPri)
        [TestMethod(Id=4,Pri=3)]
        public ReturnCode TestMethod4( ){
            return (ReturnCode) ((MethodInfo)m_methods["TestMethod4"].Invoke(m_implementer,new
object[ ]{ }));
        };
}
[Test]
public class DataAgnosticTestImplementation2{
        private DataAgnosticTestImplementation m_implementer;
        private Hashtable m_methods;
            public DataAgnosticTestImplementation1( DataAgnosticTestImplementation implementer){
            m_implementer = implementer;
               foreach (MethodInfo mi in m_implementer.GetMethods( )){
                  foreach (TestMethod Attr in mi.GetCustomAttributes(typeof(TestMethod),true)){
                    m_methods.Add(mi.Name,mi);
                  break;
                  }
               }
        }
    // Pri = MySuiteObj.ComputePriority(DataPri,MethodPri)
    [TestMethod(Id=1,Pri=1)]
    public ReturnCode TestMethod1( ){
        return (ReturnCode) ((MethodInfo)m_methods["TestMethod1"].Invoke(m_implementer,new
object[ ]{ }));
    };
    // Pri = MySuiteObj.ComputePriority(DataPri,MethodPri)
    [TestMethod(Id=2,Pri=2)]
    public ReturnCode TestMethod2( ){
        return (ReturnCode) ((MethodInfo)m_methods["TestMethod2"].Invoke(m_implementer,new
object[ ]{ }));
    };
    // Pri = MySuiteObj.ComputePriority(DataPri,MethodPri)
    [TestMethod(Id=3,Pri=3)]
    public ReturnCode TestMethod3( ){
        return (ReturnCode) ((MethodInfo)m_methods["TestMethod3"].Invoke(m_implementer,new
object[ ]{ }));
    };
    // Pri = MySuiteObj.ComputePriority(DataPri,MethodPri)
      [TestMethod(Id=4,Pri=4)]
      public ReturnCode TestMethod4( ){
        return (ReturnCode) ((MethodInfo)m_methods["TestMethod4"].Invoke(m_implementer,new
object[ ]{ }));
      };
}
[Test]
public class DataAgnosticTestImplementation1{
    private DataAgnosticTestImplementation m_implementer;
    private Hashtable m_methods;
    public DataAgnosticTestImplementation1( DataAgnosticTestImplementation implementer){
        m_implementer = implementer;
        foreach (MethodInfo mi in m_implementer.GetMethods( )){
           foreach (TestMethod Attr in mi.GetCustomAttributes(typeof(TestMethod),true)){
             m_methods.Add(mi);
             break;
           }
        }
    }
  // Pri = MySuiteObj.ComputePriority(DataPri,MethodPri)
  [TestMethod(Id=1,Pri=2)]
  public ReturnCode TestMethod1( ){
      return (ReturnCode) ((MethodInfo)m_methods["TestMethod1"].Invoke(m_implementer,new
object[ ]{ }));
};
  // Pri = MySuiteObj.ComputePriority(DataPri,MethodPri)
  [TestMethod(Id=2,Pri=3)]
  public ReturnCode TestMethod2( ){
      return (ReturnCode) ((MethodInfo)m_methods["TestMethod2"].Invoke(m_implementer,new
object[ ]{ }));
};
// Pri = MySuiteObj.ComputePriority(DataPri,MethodPri)
[TestMethod(Id=3,Pri=4)]
public ReturnCode TestMethod3( ){
    return (ReturnCode) ((MethodInfo)m_methods["TestMethod3"].Invoke(m_implementer,new
object[ ]{ }));
};
// Pri = MySuiteObj.ComputePriority(DataPri,MethodPri)
[TestMethod(Id=4,Pri=5)]
public ReturnCode TestMethod4( ){
```

-continued

```
    return (ReturnCode) ((MethodInfo)m_methods["TestMethod4"].Invoke(m_implementer,new
object[ ]{ }));
};
}
```

What is claimed is:

1. A system for automated testing of software, comprising a processor and computer readable storage device encoded with a computer program, said computer program comprising:
 a library;
 at least one template in said library that defines at least one procedure for an automated software test;
 a process for dynamically creating an instance of said at least one template, said process retrieving an attribute from a data record and creating said instance of said at least one template with a data field of said attribute as a parameter of said instance;
 wherein said instance of said at least one template is operable to cause said processor to perform said software test by providing to said software data stored in said data record;
 wherein said attribute further specifies a priority for said data for use with said at least one template;
 wherein said at least one template is a data driven test pattern class; and
 wherein the process for dynamically generating an instance of said at least one template utilizes a Document Object Model (DOM) Application Programming Interface (API).

2. The system of claim 1, wherein said attribute further specifies a priority for said at least one template.

3. The system of claim 1, further comprising a test harness.

4. The system of claim 3, wherein the test harness is designed for automated testing of managed code software.

5. A memory medium bearing instructions for automated testing of software, comprising:
 instructions representing a library;
 instructions representing at least one template in said library that defines procedures for an automated software test;
 instructions for dynamically creating an instance of said at least one template, said instructions retrieving an attribute from a data record and creating said instance of said at least one template with a data field of said attribute as a parameter of said instance;
 wherein said instance is operable to conduct a software test by providing to said software data stored in said data record;
 wherein said attribute further specifies a priority for said data for use with said at least one template;
 wherein said at least one template is a data driven test pattern class; and
 wherein the instructions for dynamically generating an instance of said at least one template use a Document Object Model (DOM) Application Programming Interface (API).

6. The memory medium of claim 5, wherein said attribute further specifies a priority for said at least one template.

7. The memeory medium of claim 5, further comprising instructions representing a test harness.

8. The memeory medium of claim 7, wherein the instructions representing a test harness are instructions designed for automated testing of managed code software.

9. A method for performing automated software tests, comprising:
 representing a library;
 representing at least one template in said library that defines procedures for an automated software test;
 dynamically creating an instance of said at least one template, retrieving an attribute from a data record and creating said instance of said at least one template with a data field of said attribute as a parameter of said instance;
 wherein said instance is operable to conduct a software test by providing to said software data stored in said data record;
 wherein said attribute further specifies a priority for said data for use with said at least one template;
 wherein said at least one template is a data driven test pattern class; and
 wherein the said dynamically generating an instance of said at least one template uses a Document Object Model (DOM) Application Programming Interface (API).

10. The method of claim 9, further comprising creating a type declaration associated with the instance.

11. The method of claim 10, further comprising adding the at least one attribute to the type declaration.

12. The method of claim 11, further comprising adding a member field to the type declaration.

13. The method of claim 12, further comprising adding a member field map to the type declaration.

14. The method of claim 13, further comprising adding a constructor declaration to the type declaration.

15. The method of claim 14, further comprising associating code with the constructor declaration, wherein the code assigns the member field to a parameter for the constructor.

* * * * *